United States Patent
Baranda et al.

(10) Patent No.: US 6,742,769 B2
(45) Date of Patent: *Jun. 1, 2004

(54) ELEVATOR SHEAVE FOR USE WITH FLAT ROPES

(75) Inventors: Pedro S. Baranda, Mexico City (MX); John T. Pitts, Avon, CT (US); Richard L. Hollowell, Hebron, CT (US); John P. Wesson, Vernon, CT (US); Douglas E. Logan, Middletown, CT (US); Zlatko Strbuncelj, Avon, CT (US); James Hubbard, Kensington, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/187,715

(22) Filed: Jul. 1, 2002

(65) Prior Publication Data

US 2003/0025109 A1 Feb. 6, 2003

Related U.S. Application Data

(63) Continuation-in-part of application No. 09/283,046, filed on Apr. 1, 1999, now Pat. No. 6,419,208, and a continuation-in-part of application No. 09/773,056, filed on Jan. 31, 2001.

(51) Int. Cl.$^7$ ................................................. B66D 3/04
(52) U.S. Cl. ....................... 254/390; 474/171; 474/184; D8/360
(58) Field of Search ................ 254/390, 393, 254/416, 912; D8/360; 474/166, 171, 184, 186, 190

(56) References Cited

U.S. PATENT DOCUMENTS

| | | | |
|---|---|---|---|
| 380,077 A | 3/1888 | Barrie | 474/166 |
| 426,638 A | 4/1890 | Fee | 474/166 |
| 975,790 A | 11/1910 | Pearson | |
| 1,011,423 A | 12/1911 | Gale, Sr. | |
| 1,035,230 A | 8/1912 | Pearson | |
| 1,164,115 A | 12/1915 | Pearson | |
| 2,413,817 A | 1/1947 | Firth | |
| 3,142,192 A | 7/1964 | Edberg | 474/166 |
| 3,498,817 A | 3/1970 | Stone | 474/166 |
| 3,713,348 A | 1/1973 | Conrad et al. | |
| 3,851,535 A | 12/1974 | Presentey | 474/166 |
| 4,034,616 A | 7/1977 | Rauscher | 474/174 |
| 4,114,751 A | 9/1978 | Nordin | 474/166 |
| 4,607,808 A | 8/1986 | Collins | 474/166 |
| 4,781,660 A | 11/1988 | Amataka et al. | 674/166 |
| 4,979,928 A | 12/1990 | Lindsay | 474/166 |
| 5,112,933 A | 5/1992 | O'Donnell, et al. | 528/61 |
| 5,281,189 A | 1/1994 | Agnoff | 474/190 |
| 5,284,457 A | 2/1994 | Gerstenberger et al. | 474/184 |

FOREIGN PATENT DOCUMENTS

| | | | |
|---|---|---|---|
| DE | 1298818 B | 7/1969 | |
| DE | 23 33 120 | 1/1975 | |
| DE | 19730400 A | 2/1999 | |
| EP | 0 356 798 A1 | 8/1989 | ........... F16H/55/38 |
| FR | 1.131.923 | 4/1955 | |
| GB | 1 362 514 | 8/1974 | |
| GB | 1 401 197 | 7/1975 | |
| GB | 2 162 283 A | 7/1984 | ........... F16C/13/00 |
| JP | 6-158264 A | 6/1994 | |
| RU | 1216120 A | 7/1986 | |
| WO | 98/29326 | 7/1998 | |
| WO | 98/29327 | 7/1998 | |

OTHER PUBLICATIONS

Sass et al., Dubbel Taschenbuckh für den Maschinenbau (1974), pp. 543–545, Springer–Verlag, Berlin.

*Primary Examiner*—Emmanuel Marcelo

(57) ABSTRACT

In an elevator sheave for a flat belt, hard, thin surface plating can be applied to enhance durability while maintaining traction.

5 Claims, 2 Drawing Sheets

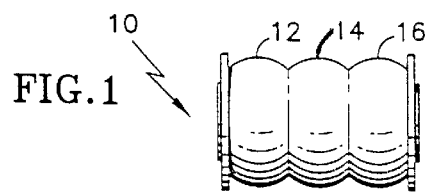
FIG. 1
FIG. 2
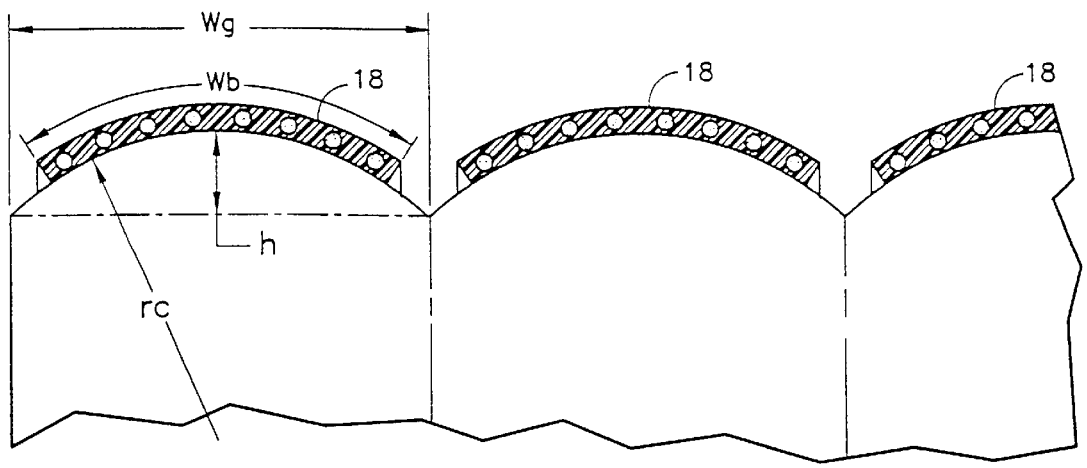
FIG. 3
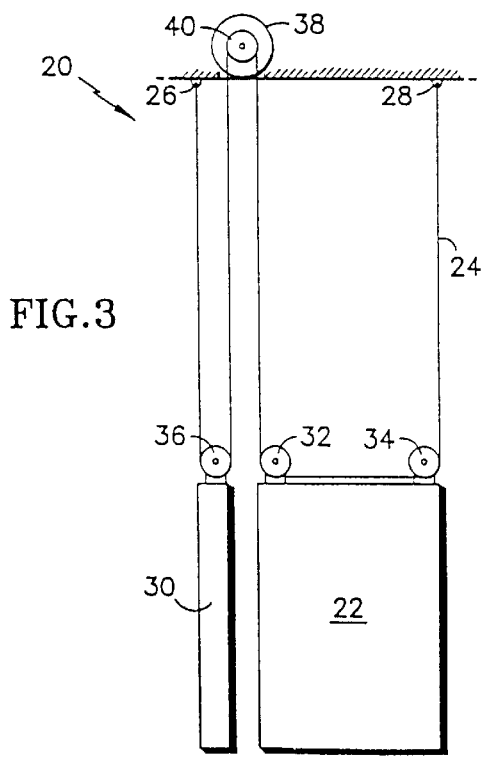

ELEVATOR SHEAVE FOR USE WITH FLAT ROPES

This is a Continuation-in-Part of copending Application Nos. 09/283,046, filed Apr. 1, 1999 now U.S. Pat. No. 6,419,208, and 09/773,056, filed Jan. 31, 2001.

TECHNICAL FIELD

The present invention relates to elevators and, more particularly, to a novel sheave design for improved performance and durability.

BACKGROUND AND SUMMARY OF THE INVENTION

Conventional elevator systems have long utilized standard elevator ropes to suspend and move elevator cars. In order to optimize performance in such areas as traction, durability, ride quality and safety, numerous design parameters have limited various components such as motors, sheaves and rope grade to certain sizes, weights and dimensions.

New generation elevator systems are being developed that eliminate the need for various conventional components, through the implementation of superior performing traction and drive systems and other advancements. These types of systems offer many advantages over traditional elevator systems, including structural versatility and economy, convenient access for servicing and repair, and lighter building loads.

One particular advancement is the implementation of high-traction, high durability elevator ropes that are smooth running, light in weight and corrosive-resistant. One such type of rope is made of a plurality of tension-carrying cord members contained in a unitary insulation jacket made of, for example, a urethane material. For optimum performance with such ropes, it is desirable to adapt various components such as sheaves to interface closely.

Conventional elevator sheaves are cast iron and designed to accommodate traditional round, steel wire ropes. With the increasing feasibility of new generation elevator ropes, such as elastomer-coated, flat ropes, new problems related to tracking, traction and durability must be addressed. It is an object of the present invention to provide a sheave design having particular dimensional, geometric, and surface characteristics selected for optimum performance and durability for use with such new generation elevator ropes.

This object and others are achieved by the present invention sheave design. The present invention sheave design provides a hard, corrossion-resistant coating on the sheave contact surface for improved durability. Another aspect of the invention relates to providing a particular circumferential roughness to the contact surface for traction. The circumferential surface roughness is preferably about 1.0 to about 3.0 microns. The coating preferably has a thickness of about 1–2 microns. The coated surface preferably has a hardness of greater than about 40 HRC.

BRIEF DESCRIPTION OF THE DRAWING

FIG. 1 is a schematic side view of a multi-rope sheave according to the present invention.

FIG. 2 is a schematic, partial view of the contact surfaces of a multi-rope sheave according to FIG. 1.

FIG. 3 is a schematic view of an elevator system according to the present invention.

DESCRIPTION OF THE PREFERRED EMBODIMENT

Figure 4:
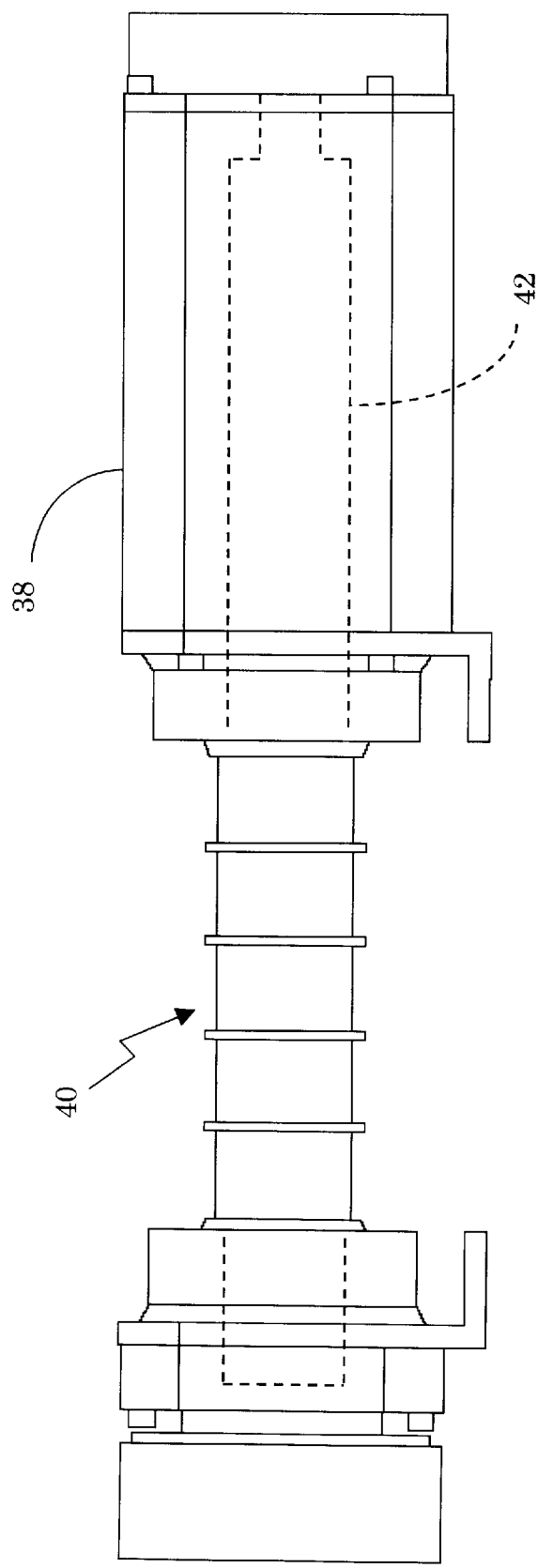
FIG. 4 is a schematic view of a machine, incorporating a multi-rope traction sheave according to the present invention.

An elevator system (20) is illustrated in FIG. 3. The system (20) includes an elevator car (22) suspended by ropes (24) having fixed ends (26, 28) that are fixed with respect to a hoistway (not shown). A counterweight (30) is also suspended by the ropes (24) and coupled to the elevator car (22) for relative movement therewith. The elevator car is suspended from the ropes (24) by car idler sheaves (32, 34) and the counterweight is suspended from the ropes (24) by a counterweight idler sheave (36). A drive machine (38) having a traction sheave (40) for engaging and driving the ropes (24 is provided in a fixed relationship with respect to the hoistway.

A multiple-rope elevator sheave (10), illustrated in FIG. 1, is adapted to engage elevator ropes (24) to provide traction and support thereto in an elevator assembly (20). Referring to FIGS. 1–2, the sheave (10) comprises a plurality of convex contact surfaces (12, 14, 16) adapted to engage friction surfaces of elevator ropes or belts (18). Each contact surface (12, 14, 16) is characterized by groove width ($w_g$), crown height (h), and crown radius ($r_c$). Flat rope or belt tracking is controlled by a crown height (h) or crown radius ($r_c$) groove width ($w_g$). In contrast to flat contact surfaces on sheaves, the convex surfaces (12, 14, 16) provide contour-conforming fit when used with a flat, flexible rope (18). With the use of such convex contact surfaces and flat, flexible ropes, configured in accordance with the present invention, it is not necessary to provide dividers between contact surfaces to maintain rope or belt tracking.

For a belt (18) having a width ($w_b$) of 30 mm, the optimum crown height (h) has been determined to be within a range of approximately 0.1 mm to 1.0 mm. The optimum radius ($r_c$) is in the range of approximately 500 mm to 1500 mm. Both the crown height (h) and the crown radius ($r_c$) may be expressed as a function of belt width ($w_b$). In the preferred embodiment, the crown height (h) is in the range of approximately 0.3 to 3.0 percent of the belt width ($w_b$). The crown radius ($r_c$) is preferably in the range of approximately 15 to 50 times the belt width ($w_b$).

The groove width ($w_g$) is in the range of approximately 1.5 and 2.25 times the width of the belt ($w_b$). This groove width accommodates misalignments that may result from installation or from movement of the elevator car and counterweight. Also, the selection of steering angles for car-mounted sheaves may result in misalignments. Car-mounted sheaves, in contrast to the traction sheave and the counterweight-mounted sheave, have two steering angles—vertical and horizontal. The ideal setting for one angle may result in a less than optimum setting for the other. With proper selection of groove height (h) and width ($w_g$), sufficient tracking may be achieved such that dividers ordinarily required between adjacent sheave grooves may be eliminated.

Traction of the traction sheave is now enhanced by providing circumferential roughness to the contact surfaces of the traction sheave. As shown in FIG. 4, the traction sheave (40) may be formed as an integral part of the output shaft (42) (shown in dashed lines) of the drive machine (38). If so, the output shaft and traction sheave can be formed of the same materials that are generally used for typical output shafts. The material may be low carbon, medium carbon or alloy steel, or other suitable material, depending on the expected loads. The output shaft can be turned from bar stock in a conventional manner, with the traction sheave being formed along with the standard bearing journals, grooves and interface features. However, conventional sheaves are machined in a manner that results in transverse roughness on the contact surface. This type of roughness does not enhance traction. Circumferential roughness provides good traction even in the presence of contaminants on the contact surface. The preferred range of circumferential roughness is approximately 1.0 to 3.0 microns. The preferred method of forming the circumferential roughness is shot peening. Grit blasting may also be used, but it provides more jagged surface texture than shot peening, thereby increasing the rate of belt wear.

Durability of the sheave is enhanced by applying a corrosion-resistant coating to the contact surface of the sheaves. The coating is a thin layer, less than 10 microns thick, and preferably 1–2 microns thick. The circumferential roughness of 1–3 microns should be present after the application of the coating to the sheave. Using a thin layer of coating permits the surface roughness and the crowning of the substrate to be maintained. The surface morphology of the coating should have an irregular or nodular nature without any sharp cutting features which might damage the surface of the rope. A hard coating is selected having a hardness of greater than 40 HRC. Without the coating, the contact surfaces of the sheave would get worn smooth. The coating is corrosion resistant to enhance the sheaves which are preferably made of steel, rather than conventional cast iron. The coating should be a low temperature coating, such as about 25–80° C., so that it can be applied to the sheave in the finished state. Preferably, where the sheave is integral to the machine output shaft, the coating is applied by a plating process, such as by plating the sheave with a coat of thin dense chrome (per AMS 2438A).

For idler sheaves, a low friction coating may be applied to the sheave or the sheave may be formed from a material that exhibits these properties, such as polyurethane. Because the traction is less important for idler sheaves, surface roughness is not essential.

While the preferred embodiments have been herein described, it is understood and acknowledged that modification and variation can be made without departing from the scope of the presently claimed invention.

What is claimed is:

1. A traction sheave for engaging an elevator rope, the traction sheave comprising:

a traction surface for engaging and driving the elevator rope; and a chrome plating applied to the traction surface and having a thickness of less than 10 microns.

2. The traction sheave according to claim 1, wherein the plated traction surface has a hardness of greater than approximately 40 HRC.

3. The traction sheave according to claim 1, wherein the plated traction surface has a circumferential surface roughness of approximately 1.0 to approximately 3.0 microns.

4. The traction sheave according to claim 1, wherein the plating thickness is in a range of approximately 1 micron to approximately 2 microns.

5. The traction sheave according to claim 1, wherein the traction surface is formed integrally with an output shaft of a drive machine.

* * * * *